United States Patent [19]

Simonson et al.

[11] Patent Number: 4,752,509

[45] Date of Patent: Jun. 21, 1988

[54] METHOD FOR THE IMPREGNATION OF WOOD

[76] Inventors: Rune Simonson, Sotenäsvägen 64, S-433 64 Partille; Knut Lundquist, Fjädermolnsgatan 16, S-417 42 Göteborg, both of Sweden

[21] Appl. No.: 848,205

[22] Filed: Apr. 4, 1986

[30] Foreign Application Priority Data

Apr. 4, 1985 [SE] Sweden ............................... 8501687

[51] Int. Cl.[4] .......................... C09D 5/10; C09D 5/18; C08L 1/00; B05D 1/18

[52] U.S. Cl. ................................. 427/440; 106/18.34; 106/163.1; 428/541; 428/907

[58] Field of Search ............... 106/15.05, 18.34, 163.1; 427/440; 428/541, 907

[56] References Cited

U.S. PATENT DOCUMENTS

| | | | |
|---|---|---|---|
| 4,303,726 | 12/1981 | Turner | 427/440 X |
| 4,347,345 | 8/1982 | Blount | 106/163.1 X |
| 4,539,235 | 9/1985 | Collins et al. | 427/440 |

*Primary Examiner*—Michael R. Lusignan

[57] ABSTRACT

A method for the impregnation of wood to prevent attack by harmful agents such as decay fungi or mould fungi and bacteria by the application of an aqueous solution of an alkali lignin modified into a water-soluble form. Impregnation takes place in two stages, these being an initial stage in which the aqueous solution containing the lignin still in its water-soluble form and with a pH not exceeding 10 is applied to the timber, and a second stage in which the lignin is fixed as a water-insoluble form by the application to the timber of a weakly acidic aqueous solution containing metal ions by the addition of metal salt.

11 Claims, 1 Drawing Sheet

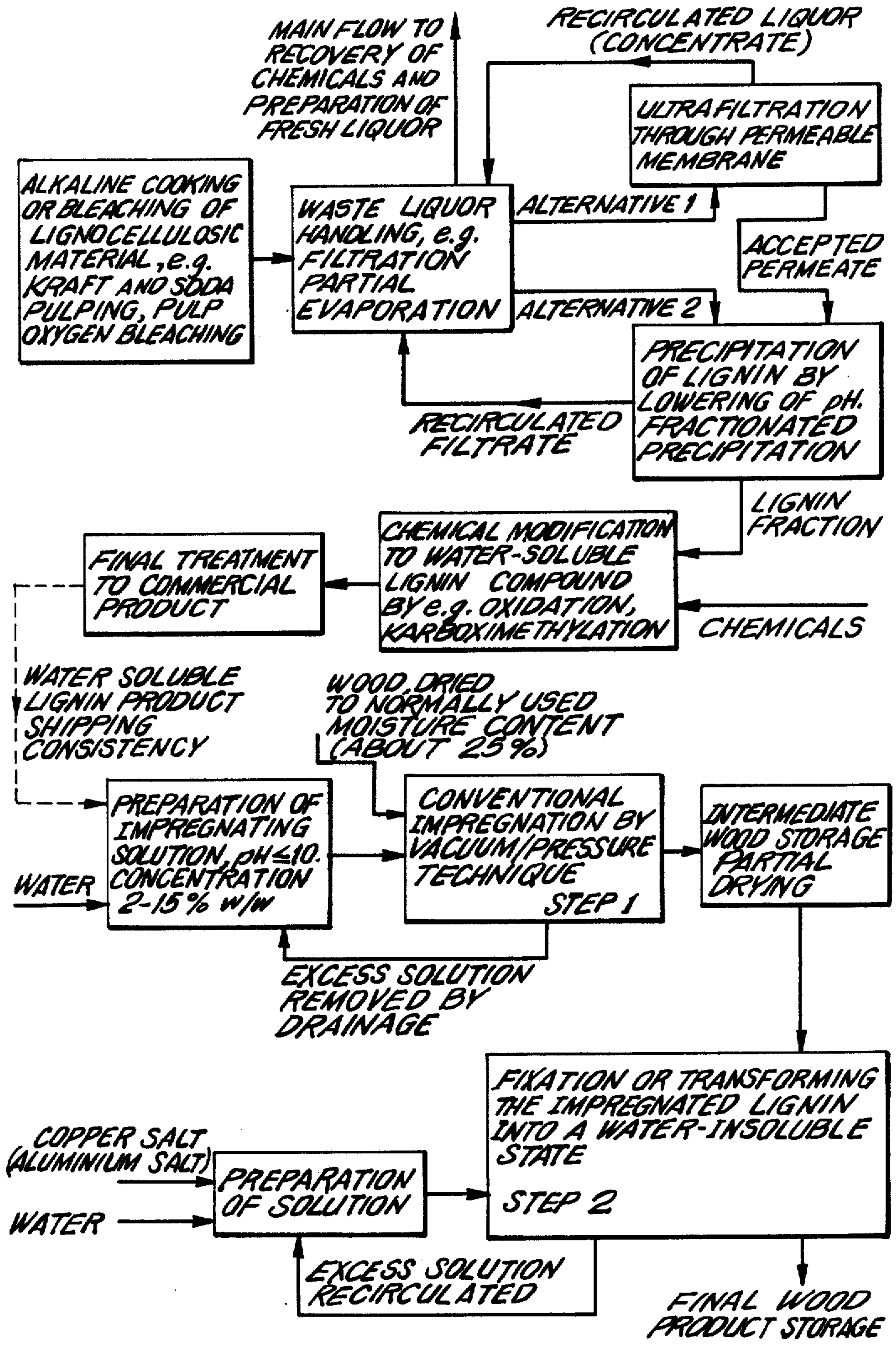
MAIN FLOW TO RECOVERY OF CHEMICALS AND PREPARATION OF FRESH LIQUOR
RECIRCULATED LIQUOR (CONCENTRATE)
ULTRAFILTRATION THROUGH PERMEABLE MEMBRANE
ALKALINE COOKING OR BLEACHING OF LIGNOCELLULOSIC MATERIAL, e.g. KRAFT AND SODA PULPING, PULP OXYGEN BLEACHING
WASTE LIQUOR HANDLING, e.g. FILTRATION PARTIAL EVAPORATION
ALTERNATIVE 1
ACCEPTED PERMEATE
ALTERNATIVE 2
PRECIPITATION OF LIGNIN BY LOWERING OF pH. FRACTIONATED PRECIPITATION
RECIRCULATED FILTRATE
LIGNIN FRACTION
CHEMICAL MODIFICATION TO WATER-SOLUBLE LIGNIN COMPOUND BY e.g. OXIDATION, KARBOXIMETHYLATION
FINAL TREATMENT TO COMMERCIAL PRODUCT
CHEMICALS
WATER SOLUBLE LIGNIN PRODUCT SHIPPING CONSISTENCY
WOOD, DRIED TO NORMALLY USED MOISTURE CONTENT (ABOUT 25%)
PREPARATION OF IMPREGNATING SOLUTION, pH≤10. CONCENTRATION 2-15% w/w
WATER
CONVENTIONAL IMPREGNATION BY VACUUM/PRESSURE TECHNIQUE STEP 1
INTERMEDIATE WOOD STORAGE PARTIAL DRYING
EXCESS SOLUTION REMOVED BY DRAINAGE
FIXATION OR TRANSFORMING THE IMPREGNATED LIGNIN INTO A WATER-INSOLUBLE STATE STEP 2
COPPER SALT (ALUMINIUM SALT)
WATER
PREPARATION OF SOLUTION
EXCESS SOLUTION RECIRCULATED
FINAL WOOD PRODUCT STORAGE

METHOD FOR THE IMPREGNATION OF WOOD

The present invention relates to a method for the impregnation of wood to prevent attack by harmful agents such as decay fungi or mould fungi and bacteria by the application of an aqueous solution of an alkali lignin modified into a water-soluble form.

Wooden material which is used for structural purposes, such as in buildings and for uprights and similar, is generally required to maintain its strength for a lengthy period. However, its durability and appearance can be seriously impaired through attack by micro-organisms such as decay fungi or mould fungi. The application of an impregnation agent to material which is exposed to moisture and in particular to material which is in contact with the soil in order to prevent such attack has previously been disclosed. Preparations containing arsenic have been in widespread use for this purpose. Products containing oil are also used. The first-mentioned substances exhibit the disadvantage of providing protection only against attack, whereas the timber is not protected against moisture absorption and drying out, leading to cracking if additional treatment is not carried out. The cost of the complete treatment will, of course, increase if additional treatment is carried out. The use of arsenic also constitutes a significant risk to the health and to the environment. Oil-based products, on the other hand, are relatively expensive and produce certain effects such as darkening of the timber and the risk of oozing, which may be undesirable in many cases.

It has proved impossible until now, however, to discover a substitute preparation with characteristics making it suitable for widespread practical use. Attempts have thus been made to use lignin as an impregnation material, which may be regarded as being non-toxic when used in this way. The lignin must be in the form of a liquid if it is to be absorbed by the timber. Only an aqueous solution is suitable for practical use. The lignin must, therefore, be transformed into a water-soluble form, although it will then be exposed to leaching in those cases in which the wooden material is exposed to moisture; as a general rule impregnated timber is used only where moisture is present. No solution has yet been found to the problem of making available a method which permits simple impregnation with the active substance in the form of an aqueous solution, and in spite of this also permitting the effective fixing of the substance against leaching.

The object of the present invention is to make available a method of impregnation in which it is possible to utilize products which are non-toxic and whose active basic substances are available in the necessary quantities at a price which is reasonable in the circumstances.

A further object of the invention is to make available a method by which the active impregnation substances can easily be applied to the timber to the necessary extent, yet will continue to exhibit high resistance to leaching.

A further object of the invention is to make available a method of impregnation which, in addition to its protective effect, also produces a dimensionally stabilizing effect on the impregnated timber without the need for any costly additional treatment.

The object of the invention is achieved by performing the impregnation in two stages, these being an initial stage in which the aqueous solution containing the lignin still in its water-soluble form and with a pH not exceeding 10 is applied to the timber in order to be absorbed by it, and a second stage in which the lignin is fixed by being transformed into a water-insoluble form in order to be retained in the timber via the effect of the timber with its content of added lignin. said second stage involving the application of a weakly acidic aqueous solution containing metal ions by the addition of at least one metal salt.

Two variants of the invention are presented as a flow chart in the accompanying drawing.

As will have been appreciated, the active part of the preparation which is used for impregnation in the method in accordance with the invention consists essentially of lignin, preferably obtained from the sulphate method for the production of paper pulp, which is known as waste-liquor lignin. Such lignin is known to be produced in large quantities during the production of paper pulp by the chemical method. This lignin is available in large quantities and at a price which makes it attractive in this context.

In order for the lignin to be capable of being absorbed by the timber in the impregnation process, it must be present in the form of an aqueous solution. Its liquid form makes it suitable for use in the established methods in which the timber is placed inside a pressure chamber and is supplied with the impregnation substance through excess pressure. It is, of course, appropriate to use water as a solvent in this case for reasons of cost, in addition to which it will combine with the moisture present in the timber.

In order for the lignin to take on a water-soluble form, it may be subjected to carboxy-methylation, for example. An appropriate starting material is sulphate lignin which has been precipitated with acid at pH 9, for example, from the industrial effluent from the sulphate boiling process. The sulphate lignin is made to react in an aqueous solution (for 10 hours at 90° C.) with NaOH and monochloroacetic acid in the mole ratio of 1:2:1, where the mole weight for a C9 unit in the lignin has been set at 200. The carboxy-methylated lignin is precipitated with acid at a pH of about 2 and is isolated by centrifuging. The lignin can be purified by subsequntly dissolving it in acetic acid and precipitating it out once more.

The actual impregnation should preferably be performed by the previously disclosed method referred to above. The timber which is to be impregnated is placed inside a pressure chamber which is then sealed. The timber is then subjected to a vacuum so that a large proportion of the air contained in its pores is removed. The impregnation solution is then applied and is subjected to pressure, causing it to penetrate into the timber. The type of timber which lends itself to this process is primarily pine, although it appears that other conifer timber and even hardwood may be used. This stage in the process and the appropriate data may be appreciated from the accompanying examples; see in particular Example 1.

A large proportion of the water will have been removed after impregnation, leaving behind the impregnation substance, the lignin. This is subject to leaching out, however, in its water-soluble form, and in this state the material would not be suitable for use in those applications in which it is primarily wished to use it, i.e. out of doors. It is accordingly necessary to fix the lignin by transforming it into a water-insoluble form. This can be achieved by treating the wooden material in a second impregnation stage with an aqueous solution of aluminium sulphate, copper sulphate or a mixture of aluminium sulphate and copper sulphate. Fixing takes place under pressure, as may be appreciated from the examples. The advantage of using copper is that this metal, even when used in small amounts, will provide additional protection against rotting. The combination of lignin and copper affords excellent resistance to white rot and to brown rot, and to tunnelling bacteria from non-sterile soil.

An important observation in conjunction with the invention is that the aqueous solution must be acid or neutral, but not alkaline, or else only weakly alkaline (pH max. 10) if a good result is to be achieved. By avoiding the use of an excessively alkaline solution, the inherent resistance to rot of the timber itself will be affected to the smallest possible degree. On the other hand the action of an alkali on the timber will cause a certain amount of swelling of the timber and thus improved penetration of the lignin into the cell wall. This has the effect of producing improved impregnation. It is accordingly important to adjust the pH value so that a good impregnation effect is achieved in return for a reasonable decrease in the natural resistance to rot of the timber. The optimum pH value lies in the range from 6 to 10. The decrease in the natural resistance relates primarily to brown rot and soft rot. The decrease which is also obtained from the weakly alkaline solution can be off-set by the addition of copper, as indicated below.

The fixing solution is applied in the form of a weakly acid solution (pH 3–7), which improves the fixing effect by facilitating the chemical process which transforms the lignin into its water-insoluble form. A relatively large quantity of metal ions is required for this process, and the quantity increases in line with the increase in the quantity of lignin used in the impregnation. At a higher concentration of lignin, which may be required in certain circumstances, the quantity of metal ions used will be larger than that provided by the copper which is required for the aforementioned additional protection against rotting. Since the price of copper is higher than the price of aluminum, it is permissible in such cases for the fixing solution to be based on a copper salt in the amount necessary for the aforementioned additional protection against rotting, with the rest being based on an aluminium salt to provide the necessary fixing. Zinc may be used instead of copper. The aforementioned additional protection against rotting requires the timber to contain a balanced quantity of copper, which may be limited to 1% calculated on the quantity of dry wood, in relation to the type of wood and the quantity of lignin applied. As will be appreciated from the examples, a quantity of copper of as little as 0.2–0.4% can produce a satisfactory effect in many cases. However, close examination of the Tables will reveal that the resistance to rot is also dependent to a certain extent on the pH value of the impregnation solution. The impregnation treatment may be aimed at specific conditions of attack in certain cases. The requirements in respect of resistance to rot may thus differ in the case of timber which is intended to be installed above the ground in relation to timber which is intended to be sunk into the soil. A higher lignin content will have the effect of improving the dimensional stability of the timber. The smallest quantity of copper necessary to provide good additional protection against rotting, i.e. the so-called threshold value, will vary with the type of wood. It is thus generally true to state that hardwoods as a rule require about twice the quantity required for conifers such as pine, for instance.

Heat also has a fixing effect by separating off the acetyl groups in the timber, and a chemical reaction between the timber material and the lignin substance, preferably in the form of an ammonium or sodium salt, will assist in the transformation of the lignin into a water-insoluble form. The temperature of the heat treatment process shall be at least 80° C., and preferably 110° C., in order for a good reaction to take place.

The invention may thus be summarized to the effect that the lignin is transformed into a water-soluble form and is applied to the timber in the form of an aqueous solution, which is easily absorbed by same. Under the applicable conditions the timber always contains moisture, and impregnation is best performed to the intended depth if a water-soluble substance is used. After this first stage, i.e. the actual impregnation, is complete the water-soluble lignin is fixed in the form in which it has been absorbed into the timber by a second stage. The benefit which attaches to this is that the first stage, i.e. the impregnation, is not affected adversely by the need to make allowance for the fixing operation, since the latter takes place as a separate stage once impregnation has already taken place.

It must be mentioned in this connection that certain advantages have been found to be associated with the process as a result of the fractionation of the lignin into a more high-molecular component and a more low-molecular component. This can be achieved by ultra-filtration, in which the lignin with a lower molecular weight is separated by its ability to pass through a membrane which, on the other hand, separates the more high-molecular lignin. Fractionation of the lignin can also be performed as fractional precipitation, for example by the acidification of the alkali lignin solution to various pH values, or by the use of various solvents. The lignin fraction with the lower molecular weight is used in the impregnation process. The benefit from this is that the consumption of chemicals for a specific rot protection treatment is lower than if high-molecular lignin were also be included. Cost savings are achieved in this way. More low-molecular lignin will also penetrate the timber better and will accordingly exhibit a greater capacity for penetration during impregnation, whereas high-molecular lignin can be precipitated out in the pore system of the timber, making penetration more difficult. A guide value to assist in achieving the desired effect is that the more high-molecular lignin with a molecular weight above a threshold limit in the area of 5000–10 000 will for the most part have been removed before the solution is prepared.

The following method can be used for this purpose:

Sulphate waste liquor with a dry matter content of about 15% is caused to pass through an ultra-filtration plant in which ultrafilters with a separation limit of about 4000 (gram-molecular weight) are used. The permeate containing low-molecular lignin and salts, etc., is acidified to pH 9, and any precipitated lignin is filtered out. The resulting Lignin preparation (with a mean molecular weight of about 1300) is modified into a water-soluble form by partial carboxy-methylation.

A dilute aqueous solution with a lignin concentration of about 3% is prepared from the lignin preparation and is used for conventional vacuum/pressure impregnation.

The accompanying Figure presents in the form of a flow diagram the manner in which the process is conducted. The process is illustrated for this purpose without fractionation into high-molecular and low-molecular lignin, as in Examples 1–4 (identified as 'Alternative 2'), and with separation in accordance with Example 5 ('Alternative 1').

EXAMPLE 1

Pieces of wood consisting of pine sapwood were impregnated at 50° C. with an aqueous solution of carboxy-methylated sulphate lignin (pH 7). Vacuum/pressure impregnation was used with a vacuum period of 30 minutes, followed by a pressure period of 90 minutes at 1 MPa. After impregnation the pieces of wood had increased in weight by about 2.5 times the original dry weight. Drying was then performed to a (certain) absorbent state so that the fixing solution could penetrate (avoiding time-consuming diffusion). After drying and weighing, the proportion of lignin absorbed was determined at about 15 percent by weight calculated on the basis of the dry wood.

In order to obtain the impregnated lignin in a water-insoluble and non-leachable form, the lignin was fixed by treating the wood material in a second stage of impregnation with an aqueous solution of aluminium sulphate, copper sulphate, or a mixture of aluminium sulphate and copper sulphate. The fixing was performed at 20° C., and the length of the period under pressure was 60 minutes at about 1 MPa.

Both untreated and treated wood was tested with regard to its resistance to white rot, brown rot, soft rot and tunnelling bacteria (non-sterile soil). The results of this rotting test are presented in Table 2. Test 1, conducted without fixing the lignin, showed a weight loss when leached with water equivalent to the leaching out of about 90% of the impregnated lignin. This treatment is inadequate, therefore, when the wood material is to be used out of doors and is to be exposed to moisture. Fixing with aluminium sulphate and/or copper sulphate resulted in a level of leaching out of the lignin in water which was less than 1% of the quantity of modified lignin applied.

As can be seen from Table 1, impregnation and fixing with aluminium sulphate alone (Test 2) produces good resistance to white rot and brown rot, although attack primarily by soft rot (non-sterile soil) was relatively severe. The application of small quantities of copper (0.3–0.4%) produced very good resistance to rotting (Tests 3 and 4), presumably due to the synergistic effect of the impregnation and the fixing.

Treatment in accordance with this process also resulted in greater dimensional stability. Tests conducted in accordance with American Standards revealed initial dimensional stability of 50% (Tests 2–4).

EXAMPLE 2

Pieces of wood consisting of pine sapwood were vacuum/pressure impregnated with an aqueous solution of carboxymethylated sulphate lignin in ammonium form (pH of about 9), followed by the fixing stage involving impregnation with a dilute copper sulphate solution for the introduction of copper ions into the timber material to a level of 0.2% Cu, which provides additional protection against rotting together with a fixing effect, which, depending on the type of timber material used, can be appropriately reinforced in certain cases by subsequent heat treatment. This took place after the application of the copper by heating the impregnated timber material to a temperature of 105°-115° C. for one hour, at the same time as which drying occurred.

Results of the rotting tests are presented in Table 2. The tests were conducted in the same manner indicated in Example 1.

EXAMPLE 3

Pieces of wood consisting of pine sapwood were impregnated in accordance with the method indicated in Example 1 using lignin solutions of various concentrations in order to produce the levels of modified lignin in the wood indicated in Table 3. The pH of the lignin solutions was either 7 or 9. Fixing was performed with a solution of aluminium sulphate and copper sulphate, or simply with copper sulphate, so that the stipulated copper levels were achieved. All the levels stipulated are applicable to pieces of wood which, after fixing, had been leached in water for one week with frequent changes of the water. The results of the brown rot test (exposure period of 7 weeks) are shown in Table 3.

EXAMPLE 4

Sulphate lignin was modified into a water-soluble form by partial oxidation which means that carboxyl groups are formed on the lignin molecules, i.e. they are "carboxylated" under conditions similar to those used in the oxygen bleaching of sulphate pulp (Sample A). Partial oxidation and sulphonation were used to produce a modified, water-soluble lignin preparation (Sample B) with a precipitation pH of 4–4.5.

Pieces of pine sapwood were impregnated in the customary fashion to produce different levels of lignin and copper, and were then rot tested after repeated leaching in water. The rot tests were performed in fungus cellars containing the fungi of white rot, brown rot and soft rot. The levels of impregnation and the results of the rot tests appear in Table 4.

EXAMPLE 5

Filtered waste liquor from the sulphate pulp production process was acidified to pH 9 and precipitated out; the high-molecular lignin was removed by filtration and centrifuging. A lignin material which was suitable for the purposes of the invention because of its lower molecular weight and partial water-solubility was precipitated out from the residue of the waste liquor by acidification to pH 3 using sulphuric acid. The material recovered in this was was transformed into a fully water-soluble form by slight carboxy-methylation.

Pieces of wood consisting of pine sapwood were vacuum/pressure impregnated at pH 7 with aqueous solutions containing different levels of carboxy-alkylated lignin including carboxy-methlated lignin and carboxy-ethylated lignin in the wood. Fixing was performed using aqueous solutions of copper salt in order to achieve the stipulated copper contents.

The results of the brown rot test (3 months' exposure) appear in Table 5.

TABLE 1

| Sample | Modified lignin, % | Fixing with | Weight loss in rotting test, %(1) | | Attack in non-sterile soil, after 3 months(2) |
|---|---|---|---|---|---|
| | | | White rot | Brown rot | |
| Reference | — | | 20.4 | 63.4 | ~5 |

TABLE 1-continued

| Sample | Modified lignin, % | Fixing with | Weight loss in rotting test, %[1] White rot | Brown rot | Attack in non-sterile soil, after 3 months[2] |
|---|---|---|---|---|---|
| 1 | 15 | — | 20.7 | 15.4 | ~4 |
| 2 | 15 | $Al_2(SO_4)_3$ | 7.3 | 10.5 | ~3 |
| 3 | 15 | $CuSO_4$ | 6.2 | 5.4 | 0[3] |
| 4 | 15 | $Al_2(SO_4)_3$ + $CuSO_4$ | 6.1 | 6.1 | 0[3] |

[1]Exposure for 3 months to white rot (*Phlebiopsis gigantea*) and to brown rot (*Fomitopsis pinicola*).
[2]Evaluated on a 5-point scale, on which 5 represents severe attack and 0 represents no attack.
[3]No attack was observed on these samples, even after exposure for 15 months. Cu content 0.3–0.4 percent by weight.

TABLE 2

| Sample[1] | Modified lignin, % | Copper content, % | Weight loss in rotting test, % White rot | Brown rot | Attack by soft rot,[2] |
|---|---|---|---|---|---|
| 1 | 10 | 0 | 0 | 18.0 | 2 |
| 2 | 10 | 0.2 | 0.2 | 0.3 | 0 |

[1]See Table 1 (Reference sample) for samples of entirely untreated wood.
[2]Evaluated on a 5-point scale, on which 5 represents severe attack and 0 represents no attack. The values indicated in the Table correspond to 5 months in non-sterile soil.

TABLE 3

| Sample | Modified lignin, % | Copper content, % in relation to dry timber | Weight loss in brown rot test Sample, % | Untreated reference, % | Weight loss ratio, sample/reference |
|---|---|---|---|---|---|
| 1 | 20 | 1.0 | 1.7 | 65.0 | 0.03 |
| 2 | 20 | 0.55 | 2.3 | 61.0 | 0.04 |
| 3[1] | 20 | 0.39 | 4.4 | 51.6 | 0.08 |
| 4 | 10 | 0.82 | 1.9 | 63.5 | 0.03 |
| 5 | 10 | 0.68 | 15.8 | 62.3 | 0.25 |
| 6[1] | 5 | 0.73 | 2.4 | 63.8 | 0.04 |
| 7 | 5 | 0.56 | 9.9 | 47.4 | 0.21 |
| 8[1] | 2.5 | 0.44 | 7.9 | 46.2 | 0.17 |
| 9 | 2.5 | 0.33 | 10.2 | 57.3 | 0.18 |

[1]pH 7 for the impregnation solution. Others pH 9.

TABLE 4

| Sample | Lignin content % | Cu content % | Attack in fungus cellar test* |
|---|---|---|---|
| A | 1.4 | 0.21 | 0 |
| | 3.8 | 0.25 | 0 |
| | 6.7 | 0.22 | 0 |
| | 7.6 | 0.32 | 0 |
| B | 1.7 | 0.23 | 0 |
| | 4.3 | 0.28 | 0 |
| | 5.9 | 0.21 | 0 |
| Reference | | | 3 |

*Rating in accordance with Table 1, Footnote 2.

TABLE 5

| Sample | Modified lignin, % | Copper content, % of dry timber | Weight loss, %** |
|---|---|---|---|
| 1 | 3.5 | 0.51 | 1.4 ± 0.2 |
| 2 | 3.5 | 0.42 | 1.3 ± 0.3 |
| 3 | 3.5 | 0.22* | 1.4 ± 0.2 |
| 4 | 7 | 0.70 | 1.3 ± 0.4 |
| 5 | 7 | 0.55 | 1.2 ± 0.2 |
| 6 | 7 | 0.24* | 1.1 ± 0.4 |
| 7 | 7 | 0.14 | 1.1 ± 0.2 |

*Fixing with an aqueous solution containing copper salt and aluminium salt.
**Weight loss in untreated reference sample 55 ± 5%.

As will be appreciated from Examples 1-5, very good protection of the wood against rot is achieved by impregnation with an aqueous solution of lignin followed by fixing of the applied lignin by modifying it into a water-insoluble form. A critical feature of impregnation is that the lignin material shall exhibit sufficient solubility in water, whilst the manner in which the lignin has been modified into its water-soluble form is not of critical significance to the rot protection capacity. Modification by oxidative treatment or by oxidative treatment in combination with partial sulphonation (see Example 4) thus produces equally good rot protection results to modification by carboxy methylation.

Nor is the degree of carboxy-methylation the critical factor affecting rot protection, on condition that the modified lignin material has been given adequate solubility. This has been demonstrated in experiments conducted on a series of carboxymethylated lignins, in which the degree of carboxy-methylation was varied by the addition of different quantities of chloroacetic acid per phenolic —OH in the lignin from 1.25 to 0.1 (mol/mol).

The invention assumes the use of alkali lignin obtained by an alkaline process for the boiling of timber, such as sulphate boiling or soda boiling, or for the bleaching of pulp. Lignin obtained by the sulphate method ought not to be used in conjunction with the invention, as it does not offer the same ease of fixing into a water-insoluble form. On the other hand, lignin from other, until now not generally familiar methods may be suitable for use. One such method which may be mentioned here is boiling with organic solvents such as ethanol, methanol and phenol (the organic sovlent method).

What is claimed is:

1. A method for the impregnation of wood objects to preserve same by preventing decay thereof which comprises the steps of (a) impregnating said wooden objects with an aqueous solution of water-soluble lignin until an effective amount of lignin is deposited therein;

(b) draining the excess of said aqueous lignin solution from said object;

(c) impregnating said object with a weakly acidic fixing solution of lignin-insolubilizing and fungistatic metal ions until a lignin-precipitating amount of said ions has been deposited therein;

(d) draining the excess metal ion solution from said object (e) and drying said thus-preserved wooden object.

2. The method according to claim 1 wherein said metal ion is provided by a fungistatic, lignin-insolubilizing source consisting of an aluminium, zinc or copper ion or a combination of these ions in the form of salts of said ions.

3. The method according to claim 2, wherein the amount of copper in said lignin insolibilizing solution in relation to dry wood is essentially not greater than 1%, and another of said lignin-insolubilizing metal salts is present in a quantity such that the lignin is fixed by the combined effect of these salts.

4. The method according to patent claim 1, wherein the aqueous water-soluble lignin solution has added to it an ammonium salt or a sodium salt, and in that the step for the fixing of the lignin involves in addition to the application of the metal ion the heating of the wooden object to a temperature of about 110° C.

5. The method according to claim 2 wherein copper ion is applied to wooden objects by the use of a solution of a copper salt in the fixing step.

6. The method according to claim 2, wherein zinc ion is applied to the wooden object by the use of a solution of a zinc salt in the fixing stage.

7. The method according to claim 1, characterized in that the lignin is modified to water-soluble carboxylated alkali lignin, by oxidation.

8. The method according to claim 1, wherein the lignin is modified to a water-soluble, carboxy-alkylated lignin, selected from the group consisting of carboxy-methylated and/or carboxy-ethylated alkali lignin.

9. The method according to claim 1, wherein the water-soluble lignin, modified into a water-soluble form, is further modified by sulphonation.

10. The method according to claim 1, wherein alkali lignin, used to produce the water-soluble lignin solution, has the components of the lignin, with a molecular weight of more than 5000–10,000, removed by fractionating.

11. The method according to claim 1 wherein said object is dried by heating to a temperature of at least 80° C. in order to ensure fixing of said metal-insolubilized lignin within said object.

* * * * *